Feb. 28, 1961 R. E. CLAFLIN, JR., ET AL 2,973,468

CARRIER TYPE AMPLIFIER

Filed Oct. 11, 1957 3 Sheets-Sheet 1

INVENTORS
Raymond E. Claflin Jr.
Roderic J. Procaccino

BY

Blair & Spencer
ATTORNEYS

INVENTORS
Raymond E. Claflin Jr.
Roderic J. Procaccino
BY
Blair & Spencer
ATTORNEYS Feb. 28, 1961 R. E. CLAFLIN, JR., ET AL 2,973,468

CARRIER TYPE AMPLIFIER

Filed Oct. 11, 1957 3 Sheets-Sheet 3

INVENTORS
Raymond E. Claflin Jr.
Roderick J. Procaccino

BY

Blair & Spencer
ATTORNEYS

United States Patent Office 2,973,468

Patented Feb. 28, 1961

2,973,468

CARRIER TYPE AMPLIFIER

Raymond E. Claflin, Jr., Bedford, and Roderic J. Procaccino, West Acton, Mass., assignors to The Oilgear Company, Waltham, Mass.

Filed Oct. 11, 1957, Ser. No. 689,648

18 Claims. (Cl. 318—257)

Figure 1:
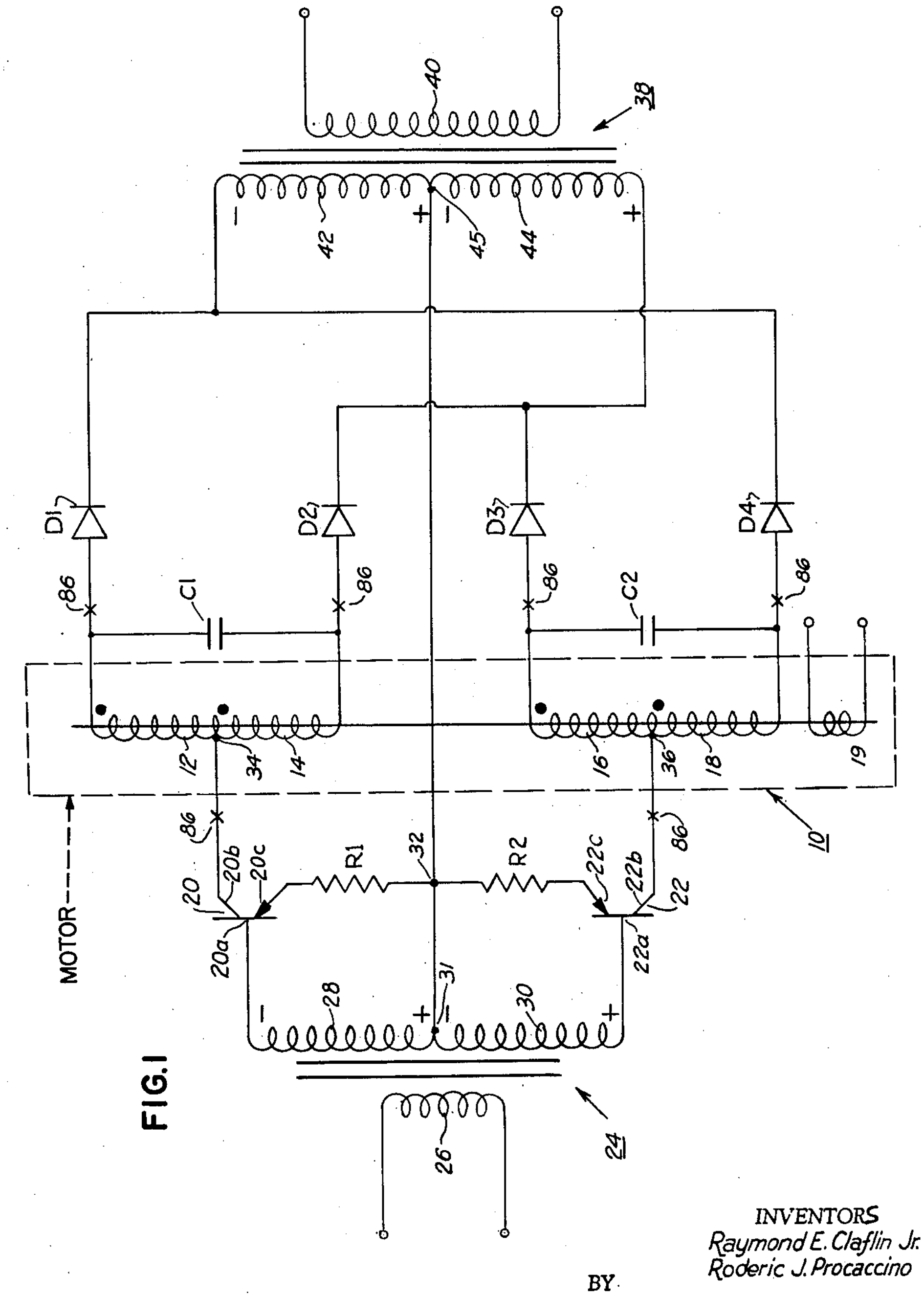

This invention relates primarily to improved electronic output circuits which may be used to advantage in carrier type servo systems to supply phase reversible A.-C. or D.-C. output currents for mechanical outputs whose direction and magnitude depend on the phase and magnitude of an A.-C. input signal. More particularly, it relates to highly efficient amplifiers and amplifier-demodulator systems providing mechanical outputs in response to electrical inputs in which the output is identically zero for a zero input signal.

Our invention is of particular utility in servo systems having mechanical outputs controlled and in some cases powered by electrical amplifiers. These systems utilize electrical-to-mechanical transducers, e.g. conventional motors, torque motors, force motors, etc., to convert the electrical signals from the amplifiers to mechanical control or output motions. The input of such an amplifier is generally in the form of an amplitude-modulated suppressed-carrier signal, the magnitude of the mechanical output being determined by the amplitude of the carrier and the direction by its phase.

The use of a carrier requires demodulation of the signal. When direct-current transducers are used, demodulation is generally accomplished in the amplifier; in an A.-C. transducer demodulation is an inherent function of the transducer itself, which converts the alternation current or voltage input into a unidirectional mechanical output.

Prior to our invention many servo power amplifiers have been operated in the Class A region with plate efficiencies no greater than 25% and with relatively large quiescent currents requiring oversize tubes and output elements; other amplifiers designed for Class B operation may have an efficiency of up to 60%. Even the latter figure, however, results in a plate power waste of 40% in vacuum tubes so operated. On the other hand, present day requirements dictate minimum size and weight for both amplifier and power supply.

A problem peculiar to amplifiers with direct-current outputs relates to the requirement of zero output current for a zero input signal. To accomplish this, two control elements, e.g. vacuum tubes or transistors, are usually operated as arms of a balanced bridge circuit. Balance is maintained by controlling one or more resistances in the other arms of the bridge. However, since the characteristics of the control elements vary with such parameters as time, supply voltage and environmental conditions, constant re-balancing of the bridge is required to provide the desired zero output. Thus the use of such amplifiers is impractical where long periods of unattended operation are required.

A further desirable characteristic of present day electronic systems is interchangeability of the various units incorporated therein. Thus it is desirable to keep the number of different components to a minimum to simplify maintenance problems and reduce the required number of spare or replacement units. Interchangeability also reduces manufacturing and storage costs since only one unit need be designed and built for a number of different functions. Therefore it is desirable that a servo amplifier be capable of driving both direct-current and alternating-current transducers; prior to our invention amplifiers have not been provided having such interchangeability.

Accordingly, it is an object of our invention to provide an improved output circuit adapted to furnish a mechanical output from a modulated-carrier electrical input. It is a further object of our invention to provide a circuit of the above character having zero mechanical output at zero input level and capable of efficient operation with electro-magnetic output elements. It is another object of our invention to provide a circuit of the above character incorporating a direct-current transducer. A still further object of our invention is to provide a circuit of the above character incorporating an alternating-current transducer. It is a further object of our invention to provide an amplifier for use in a circuit of the above character capable of efficient use with both alternating-current and direct-current output elements. Yet another object of our invention is to provide alternating and direct-current transducers for use as output elements in circuits of the above character. Yet another object of our invention is to provide amplifiers of the above character having improved efficiency. A further object of our invention is to provide an improved demodulator for use in circuits of the above character and capable of passing modulation frequencies higher than those of comparable prior systems. Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

Figure 2:
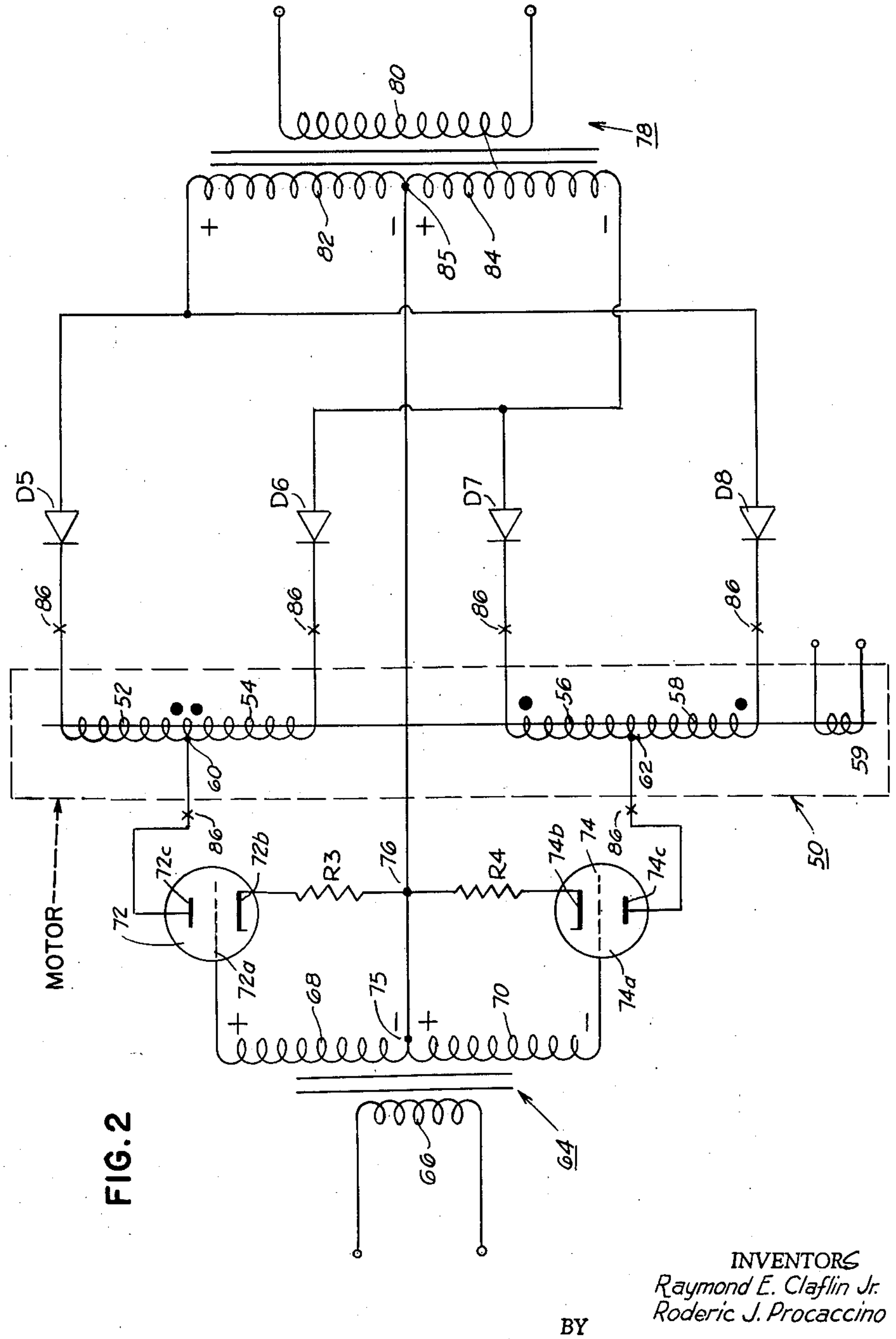
Figure 3:
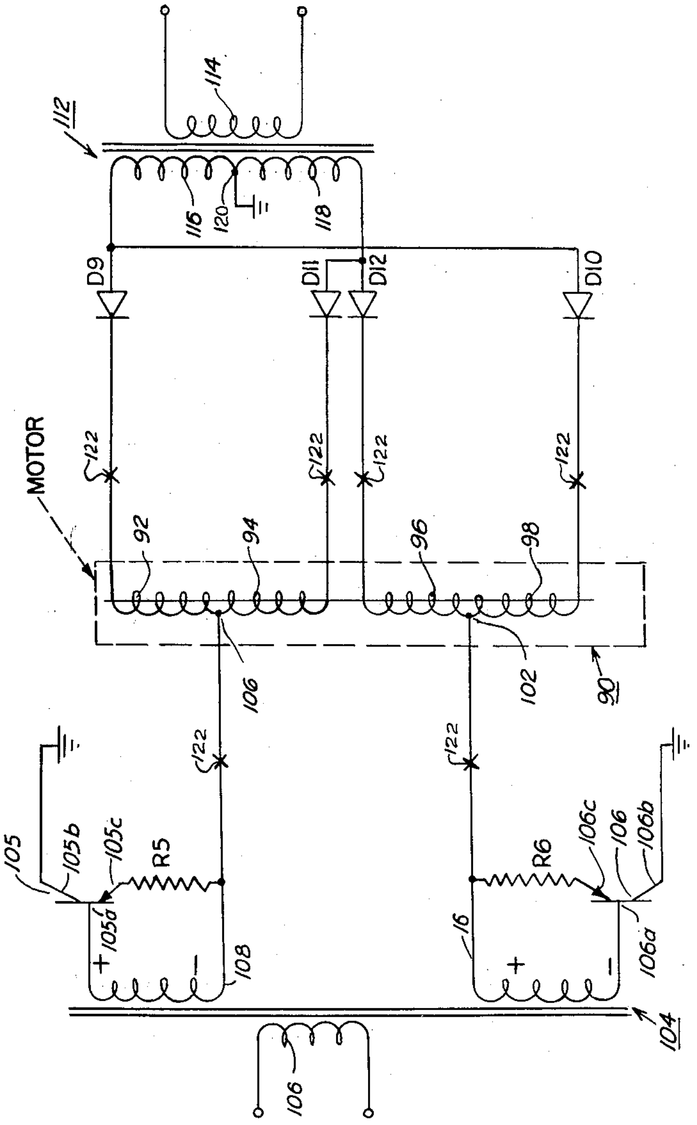

For a fuller understanding of the nature and objects of the invention, reference should be had to the following detailed description taken in connection with the accompanying drawings, in which:

Figure 1 is a schematic diagram of a direct-current output circuit made according to our invention and using p-n-p transistors as amplifying elements, Figure 2 is a schematic diagram of an alternating-current output circuit made according to our invention and incorporating vacuum tubes as amplifying elements, and Figure 3 is a schematic diagram of an output circuit incorporating p-n-p transistors connected in a grounded collector arrangement.

Similar reference characters refer to similar parts throughout the several views of the drawings.

In general, our amplifier utilizes control and amplifying elements such as tubes or transistors biased to operate in the Class B region. Thus, in addition to their usual amplifying function, they serve like switching elements, keyed on or off by alternate half cycles of the input signal. The plate or collector voltages for the control elements are derived unfiltered through full-wave rectification of a reference signal with which the input signal is compared in phase to determine the direction of the mechanical output of the circuit. Half cycles of the reference signal are applied to each amplifying element alternately through two windings formed on the same magnetic core, these windings being field or armature windings, appropriate to the output transducer.

If the transducer is a D.-C. motor, the windings are arranged in a flux-opposing relationship and thus with zero input signal, output current flowing alternately through the windings will generate an alternating flux to which the motor does not have a net response in one direction. Since each control element conducts to the same extent on every half cycle, the magnitude of the flux generated on alternate half cycles will be equal, and there will be no direct component regardless of changes in the characteristics of the tubes or transistors. Upon application of a finite input signal, the control or amplifying element will conduct to a greater extent on alternate half cycles, thereby generating a preponderance of flux in one of the two windings and a net direct component of flux capable of displacing the armature. The direction of the mechanical output depends on which of the two windings is so energized and in turn on the phase relationship of the input and reference signals.

In alternating-current operation, the motor windings electrically connected in the circuit are arranged in a flux-aiding relationship and thus, at zero input signal the flux has a direct component and an alternating component whose lowest component frequency is twice that of the reference signal. Since armature displacement is effected by interaction of the magnetic fields developed in these windings with the field developed in another winding energized by the reference voltage, none of these components provides a net desired mechanical output. With a finite input signal one or the other of the windings, depending on the phase relationship, develops a pulsating unidirectional flux which has an alternating component at the frequency of the reference signal, and more action ensues. The phase of this flux component, and therefore also the direction of the mechanical output, again depend upon the phase of the input signal.

In practice our circuits have a second similarly connected amplifying element arranged in a push-pull relationship to provide greater efficiency. This novel arrangement provides other substantial advantages to be described.

As will be shown, the amplifier itself is the same for both A.-C. and D.-C. output; thus complete interchangeability is provided. A further advantage lies in the fact that during each conduction period the plate or collector supply voltage has the same wave form as the input signal and this provides an efficiency materially greater than that of conventional Class B circuits.

Turning now to Figure 1, our circuit may include a direct-current motor, generally indicated at 10, having control windings in pairs designated 12 and 14, and 16 and 18. Illustratively a winding 19 may also be provided, the magnetic field, developed in this winding interacting with that developed in the other windings to provide displacement of an armature (not shown). The dots adjacent the control windings indicate the ends of the windings through which current enters to produce flux having the same effect on the motor; generally, the windings have a common flux path, and currents entering the dotted ends of the windings produce flux in the same direction along that path. Preferably the control windings in each pair are balanced so that equal currents in them produce equal fluxes.

The motor 10 is controlled by a pair of p-n-p transistors 20 and 22 in a manner to be described. The input to the circuit is through a transformer generally indicated at 24, having a primary winding 26 and a center-tapped secondary with windings 28 and 30. Windings 28 and 30, whose relative phases are indicated by the polarity signs adjacent thereto, are connected to the bases **20*a* and 22*a* of transistors 20 and 22 and the center tap 31 is connected to a common point 32. The collectors 20*b* and 22*b* of the transistors are connected to junctions 34 and 36 connecting windings 12 and 14 and 16 and 18, respectively. The collector currents for the transistors thus pass through the control windings of the motor 10** to power it.

Still referring to Figure 1, the collector currents of the transistors are derived from a transformer, generally indicated at 38, having a primary winding 40 and center-tapped secondary with windings 42 and 44. Winding 42 is connected to motor windings 12 and 16 through diodes D1 and D3, and winding 44 is connected to windings 14 and 18 through diodes D2 and D4, respectively. The center tap 45 of transformer 38 is connected to junction 32 and resistors R1 and R2 may be connected between junction 32 and the emitters **20*c* and 22*c*** of the transistors to complete the input and output circuits thereof.

As shown in Figure 1, diodes D1, D2, D3 and D4 are arranged to supply voltages between junction 32 and the collectors of the transistors of correct polarity to reverse bias the base-collector junctions. The diodes are connected to pass half cycles of the reference signal to the transistors alternately through one and then the other of the windings in each pair; since the voltage rectified thereby is unfiltered, the collector-base voltages applied to the transistors have the form of successive half sine wave pulses. These pulses are alternately applied through windings 12 and 14 to transistor 20 and windings 16 and 18 to transistor 22. Assuming zero signal input to transformer 24, the conduction of transistor 20, for example, will be the same on alternate half cycles but through different motor windings. This action results in magnetic fluxes of equal magnitude and similar wave form, first in one direction and then in the other in the common flux path of the windings. The flux will therefore have only alternating, and no direct, components and there will be no net output of the motor 10 which is responsive only to a direct component of the flux.

Should the characteristics of transistor 20 change, the balance condition will still obtain, since the alternate half cycles of conduction are through the same transistor. Likewise the output of transistor 22, as registered in control windings 16 and 18, produces a flux having no direct components. Thus the balance of the output is independent of the relative characteristics of transistors 20 and 22.

Should a finite input signal be impressed on primary winding 26, the operation of the circuit of Figure 1 will be as follows. The transistors will conduct to a greater extent during the half cycles of the input signal in which their bases are negative with respect to junction 32. Thus, assuming the relative polarities of the input and reference signals indicated by the plus and minus signs adjacent the secondaries of transformers 24 and 38, the base **20*a* of transistor 20 will go negative during the half cycle of reference signal when diode D1 conducts and substantially all of the collector current of this transistor will pass through winding 12 of motor 10**. This produces a flux in the motor having a large direct component and therefore producing motor force (translational or rotational) in a direction determined by the direction of the flux.

Transistor 22 conducts during the next half cycle when transistor 20 is essentially cut off. Its collector current is passed by diode D3 and winding 16; the flux pulse produced thereby is in the same direction as the flux produced by the current through winding 12 on the previous half cycle. Thus transistors 20 and 22 contribute direct flux components in the same direction on alternate half cycles, providing a push-pull electrical output with increased efficiency. Capacitors C1 and C2 may be connected across pairs of windings 12 and 14 and 16 and 18, respectively, to act as filters increasing the proportion of direct component of flux when an input signal is applied to the amplifier. It will be noted that since the ripple frequency to be filtered out by capacitors C1 and C2 is twice the reference frequency, the capacitors may have a value considerably less than that of those used in previous systems where the ripple frequency is equal to the reference frequency. The smaller capacitance provides a shorter time constant and thus improved output at higher modulation frequencies.

Should the polarity of the input voltage be reversed, conduction of transistor 20 will take place through diode D2 and winding 14 and that of transistor 22 will be through diode D4 and winding 18 thereby developing flux in the opposite direction from that previously described and producing force in the opposite direction. Thus, with the arrangement of the control windings shown in Figure 1, motor 10 acts as a summing device. Its output is responsive to the differences between the currents in the two windings of each pair, i.e. it effectively subtracts the current in one winding of a pair from that in the other winding thereof. The motor also responds to the sum of the currents in windings conducting on alternate half cycles, i.e. it effectively adds the current in winding 12 to that in winding 16 and the current in winding 14 to that in winding 18. Since the collector currents of transistors 20 and 22 are essentially proportional to the emitter currents, the magnitude of the mechanical output is proportional to the amplitude of the electrical input to the system.

In Figure 2 we have illustrated a servo output circuit utilizing vacuum tubes as control and amplifying elements and an A.-C. motor for mechanical output. Thus an A.-C. motor generally indicated at 50 has two pairs of balanced control windings 52 and 54, and 56 and 58. A reference winding 59 connected to a reference voltage source (not shown) develops flux which interacts with that of the control windings to provide motor action. As indicated by the polarity dots adjacent thereto, the control windings in each pair develop magnetic fields in the same direction along common flux paths for currents passing through them to the junctions 60 and 62.

The signal input to the circuit of Figure 2 is applied to a transformer generally indicated at 64 having a primary winding 66 and a center-tapped secondary with windings 68 and 70. Windings 68 and 70 may be connected directly to the grids **72*a* and 74*a* of two suitable vacuum tubes 72 and 74 whose plates 72*c* and 74*c* are connected to junctions 60 and 62; the center tap 75 thereof is connected to a common point 76. Plate power for tubes 72 and 74 is supplied through the windings of motor 50 by a transformer generally indicated at 78 whose primary winding 80 is connected to the reference voltage source. Transformer 78 has a center-tapped secondary comprising windings 82 and 84. The center tap 85 thereof is returned to point 76 and the other ends of the windings are connected to motor windings 52, 54, 56 and 58 through diodes D5, D6, D7 and D8. These diodes are arranged to pass current in the direction of conduction of tubes 72 and 74. Cathode resistors R3 and R4 connected between point 76 and the cathodes 72*b* and 74*b*** of the tubes complete the grid and plate circuits thereof.

In operation, the plate currents of the tubes 72 and 74 are passed through one and then the other of the diodes connected thereto during alternate half cycles of the reference voltage input applied through transformer 78. The diode conducting during any given half cycle is the one connected to the secondary winding of transformer 78 which is then positive with respect to point 76. Thus at zero signal input the plate current of tube 72 will pass alternately through motor control windings 52 and 54 and, as seen in Figure 2, the currents in both windings will produce magnetic flux in the same direction. The net flux developed by the plate current of this tube will thus have a direct component to which the alternating-current motor 50 has no net response and alternating components whose lowest frequency is twice that of the supply voltage frequency; the motor is also insensitive to these higher order frequencies. As with the direct-current circuit of Figure 1, balance does not depend on the characteristics of tube 72. The operation of tube 74 at zero signal is the same as that of tube 72.

If an input signal is applied to the primary winding 66 of transformer 64, substantially all conduction through tubes 72 and 74 will take place during the half cycles when the respective grids are positive with respect to point 76. Thus, assuming the relative polarities of input and reference signals indicated by the polarity signs adjacent transformers 64 and 78, tube 72 will conduct when secondary winding 82 goes positive and its plate current will thus pass through diode D5 and motor winding 52. These conducting pulses occur on alternate half cycles and therefore the flux developed thereby has an alternating component whose frequency is equal to that of the reference voltage applied to motor winding 59. A net force or torque is thus developed in motor 50 to displace it in a given direction. Tube 74 conducts during the half cycle when tube 72 is cut off and therefore its current passes through diode D7 and motor winding 56; the flux pulses developed in winding 56 are of opposite direction to those of winding 52, and therefore the net flux developed in motor 50 by the circuit of Figure 2 is almost entirely alternating in form and of the same frequency as the reference voltage.

Should the phase of the input voltage be reversed, the half cycles during which tubes 72 and 74 conduct will be reversed; thus the plate current of tube 72 will pass through diode D6 and motor winding 54 and that of tube 74 through diode D8 and winding 58. The phase of the flux developed by the windings will thus be reversed with respect to that developed by the reference winding and therefore the direction of motor output will be reversed. The magnitude of the mechanical output of the motor 50 is proportional to the amplitude of the input signal.

From the foregoing it will be apparent that the difference in operation between the direct-current system of Figure 1 and the alternating-current system of Figure 2 is due to the differences in the arrangements of the motor control windings of the two circuits. Demodulation necessary for direct-current action is provided when the windings in each pair thereof are arranged to produce flux in opposite directions for currents passing through the junction between the windings as indicated by the polarity dots; alternating-current output is provided when the windings are arranged to produce flux in the same direction. Motor 50, like motor 10, serves as a summing device. However, its function is effectively to add the currents in each pair of control windings and substract the total current in one pair from that in the other. As with motor 10 the summing function is actually performed on the magnetic fields developed along a common flux path. Thus each of the amplifiers of Figures 1 and 2, including the rectifying arrangements for providing collector or plate current, as the case may be, may be used with both A.-C. and D.-C. motors. The amplifiers may be constructed and packaged with terminals corresponding to the connections indicated at 86 (Figures 1 and 2) for universal connection to A.-C. or D.-C. motors. The advantages accuring in the manufacture and stocking of the amplifiers and in maintenance of the systems in which they are used will be readily apparent.

In Figure 3 we have illustrated a modification of our circuit incorporating transistors connected in a grounded collector arrangement. As shown therein a motor generally indicated at 90 has windings in matched or balanced pairs 92 and 94 and 96 and 98, windings 92 and 94 being connected to a common junction point 100 and windings 96 and 98 being connected to a similar point 102. The directions of the fluxes developed by currents through the windings depend on whether the motor is designed for direct-current or alternating-current operation as described above. A signal input transformer generally indicated at 104 has a primary winding 106 and two balanced secondary windings 108 and 110. The secondary windings are connected between junction points 100 and 102 and bases **105*a* and 106*a* of two p-n-p transistors 105 and 106. The relative polarities of windings 108 and 110 are indicated by the polarity signs adjacent thereto (Figure 3) and are such as to maintain the bases of the transistors at opposite polarities relative to the respective common junction points when an input signal is applied to primary winding 106**.

Still referring to Figure 3, the collector supply voltages are developed through full wave rectification of the reference voltage in the same manner as in the circuits of Figures 1 and 2. Thus, a transformer generally indicated at 112 has a primary winding 114 for connection to the reference voltage source and a center-tapped secondary comprising windings 116 and 118. Winding 116 is connected to motor coils 92 and 98 through diodes D9 and D10 and winding 118 is connected to windings 94 and 96 through diodes D11 and D12. The diodes are arranged to conduct in the proper direction to provide reverse biasing potentials across the collector-base junctions of transistors 105 and 106. The collector circuits are completed by grounding the collectors **105*b* and 106*b* along with the center tap 120 of the secondary of transformer 112. Resistors R5 and R6 connected between junctions 100 and 102 and the emitters 105*c* and 106*c***, respectively, complete the circuits.

The operation of the circuit of Figure 3 is similar to that described above. At zero input signal level, successive half cycles of collector current pass through alternate motor windings in each pair thereof, with the consequent balance condition and zero output described above. When an input signal is impressed on the terminals of primary winding 106, each transistor conducts during the half cycle of the input signal in which its base is negative with respect to its emitter, and the direction of output of motor 90 depends upon the phase of the input signal relative to that of the reference voltage. It will be apparent that the amplifier of Figure 3 may be connected to either a D.-C. or an A.-C. motor, and interchangeability is accomplished by providing amplifier terminals as indicated by the reference characters 122.

Thus, we have described a servo amplifier and demodulator circuit which has a zero mechanical output for a zero electrical input, and whose output is proportional to the magnitude of the input signal. The direction of the output is determined by the phase of the carrier. The circuit includes a novel amplifier which may be connected to either an A.-C. or a D.-C. output transducer and in which, by the use of a collector or plate supply voltage having the same wave form as the input signal, the control elements, i.e. tubes, transistors, etc., may operate at efficiencies of better than 90%. The amplifier may use vacuum tubes or transistors in any of the basic circuit arrangements thereof. We have also described alternating-current and direct-current transducers for use in our output circuits. The circuits are compact and simple in construction. Because of their inherent balance feature, they may be left unattended for long periods of operation. Simplicity of system maintenance is provided by interchangeability of the amplifiers from alternating-current to direct-current outputs.

In addition to the above features, other important advantages accure from the use of our circuits. For example, the direct-current circuits respond only to carrier components in phase or 180° out of phase with the reference signal, thus rejecting the unwanted quadrature components. It will also be apparent that the output elements need not always be motors. In alternating current circuits for example, the control windings may be windings of an output transformer.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also be understood that the following claims are intended to cover all of the generic and specific features of the invention herein described, and all statements of the scope of the invention which, as a matter of language, might be said to fall therebetween.

We claim:

1. In an electrical amplifier in which the input signal is in the form of amplitude-modulated carrier, the combination of a pair of control elements, each of said control elements having a pair of control terminals and first and second output terminals, the signals applied to said control terminals determining the electrical resistances of said elements between their respective output terminals, input means for applying said input signal to said control terminals in such manner that the resistance between one pair of output terminals is at a minimum when the resistance between the other pair thereof is substantially at a maximum upon the application of a finite input signal, two pairs of electrical windings, means connecting a first terminal of each of said windings in one pair thereof to said first output terminal of one of said output elements, means connecting a first terminal of each of said windings in the other pair thereof to said first output terminal of said other control element, a reference signal source connected in series with said output terminals of each of said control elements and the windings connected thereto, said source being adapted to apply electrical pulses across said output terminals through said windings with one pulse occurring for each half cycle of the carrier, said source including gating means adapted to pass alternate pulses through one of said windings in each pair thereof and the other pulses through the other windings, and summing means for summing the currents passing through said windings, said summing means being responsive to the difference between the currents in the windings in each pair thereof and further responsive to the difference between the currents in the windings in one pair and the respective windings in the other pair which pass pulses from said reference source at the same time.

2. In a demodulator for demodulating an amplitude-modulated signal and providing an output whose magnitude is proportional to the amplitude of the carrier and whose direction is determined by the phase of said carrier, the combination of a pair of control elements, each of said control elements having a pair of control terminals and first and second output terminals, said control elements being so constructed that the signals applied to said control terminals determine the electrical resistances of said elements between their respective output terminals, input means for applying said input signal to said control terminals, the phase relationship of the signal applied to said pairs of control terminals being such that the resistance between one pair of output terminals is at a minimum when the resistance between the other pair thereof is substantially at a maximum upon the application of a finite input signal, two pairs of impedance elements, each of said impedance elements having two terminals, means connecting a first terminal of each of said impedance elements in one pair thereof to said first output terminal of one of said control elements, means connecting a first terminal of each impedance element in the other pair to said first output terminal of the other control element, a reference signal source connected in series with the output terminals of each of said control elements and the impedance elements connected thereto, said source being adapted to apply electrical pulses across said output terminals through said impedance elements with one pulse occurring for each half cycle of the carrier, said source including gating means adapted to pass alternate pulses through one of the impedance elements in each pair thereof and pass the remaining pulses through the other impedance elements, and output means including means responsive to the sum of the difference between the currents in the impedance elements in one pair thereof and the difference between the currents in the impedance elements in the other pair thereof.

3. The combination defined in claim 2 in which said impedance elements are electrical windings.

4. The combination defined in claim 3 in which the electrical windings in each pair thereof have a common magnetic flux path and said output means adds the flux in one common path to that in the other common path.

5. The combination defined in claim 3 in which all of said windings have a common magnetic flux path and said output means is responsive to the flux in said path.

6. In an output circuit adapted to provide a mechanical output in response to an amplitude-modulated electrical input signal the combination of a pair of control elements, each of said control elements having a pair of control terminals and first and second output terminals, said control elements being so constructed that such signals applied to said control terminals determine the electrical resistances of said elements between their respective output terminals, input means for applying said input signal to said control terminals in such phase relationship that the resistance between one pair of output terminals is at a minimum when the resistance between the other pair of output terminals is substantially at a maximum, a motor having two pairs of control windings, each of said windings having two terminals, means connecting a first terminal of each winding in one pair thereof to said first output terminal of one of said control elements, means connecting a first terminal of each winding in the other pair thereof to said first output terminal of the other control element, a source of magnetic flux adapted to provide flux interacting with that developed in said windings by currents therein, the interaction of said fluxes producing mechanical output in said motor, a reference signal source connected in series with the output terminals of each of said control elements and the control windings connected thereto, said source being adapted to apply electrical pulses across said output terminals through said control windings with one pulse occurring for each half cycle of the carrier, said source including gating means adapted to pass alternate pulses through one of the control windings in each pair thereof and the remaining pulses through the other control windings.

7. The combination defined in claim 6 in which said flux source provides a unidirectional flux, said control windings being so arranged that said motor responds to the sum of the differences in the currents through the control windings in each pair thereof.

8. The combination defined in claim 6 in which said flux source and all of said control windings have a common flux path.

9. In an amplifier for amplifying an amplitude-modulated signal, the combination of a pair of control elements, each of said control elements having a pair of control terminals and first and second output terminals, said control elements being so constructed that such signals applied to said control terminals determine the electrical resistances of said elements between their respective output terminals, input means for applying an input signal to said control terminals, the signal applied to one pair of control terminals being in phase opposition to that applied to the other pair thereof, means connecting a first input terminal and a first output terminal of each of said control elements to a common point, two pairs of impedance elements, each of said impedance elements having two terminals, means connecting a first terminal of each of the impedance elements in one pair thereof to said second output terminal of one of said control elements, means connecting a first terminal of each of said impedance elements in the other pair thereof to said second output terminal of the other control element, means connecting the second terminals of each of said impedance elements to said common point, a reference signal source connected in series with each of said impedance elements and the control element connected thereto, said reference source including a source of alternating current having a frequency substantially the same as that of said carrier and means for rectifying said alternating current, said rectifying means being connected in series with each of said impedance elements whereby on alternate half cycles of said reference signal one of said impedance elements in each pair thereof passes pulses to the control element whose second output terminal is connected thereto and on the remaining half cycles the other impedance elements pass said pulses, said pulses being of proper polarity to be conducted by said control elements, and output summing means for summing the currents in said impedance elements, said output summing means being a motor having a flux source, said impedance elements being control windings in said motor, the flux developed by currents through said windings interacting with said flux from said flux source to provide a mechanical output from said motor.

10. The combination defined in claim 9 in which said alternating-current source is a transformer having a pair of secondary windings, one terminal of each of said secondary windings being connected to said common point, the other terminal of one of said secondary windings being connected to one of the impedance elements in each pair thereof, and the other terminal of the other secondary winding being connected to the other impedance elements.

11. A motor having two pairs of control windings and a flux source, each of said control windings having two terminals, said control windings having a common flux path with said flux source, whereby the flux developed by currents in said control windings may interact with the flux from said flux source to provide an output force in said motor, and means connecting one terminal of one winding in each pair thereof to one terminal of the other winding in the same pair.

12. The combination defined in claim 11 in which in each pair of control windings currents through each winding toward the other winding develop flux in different directions along said flux path.

13. In an output circuit adapted to provide a mechanical output in response to an amplitude-modulated input signal, the combination of first and second control elements, each of said elements having a pair of input terminals and an output signal path, the resistances of said signal paths being functions of the instantaneous magnitudes of the signals applied to said pairs of input terminals, input means for applying said input signal to said pairs of input terminals in such manner that the variations of the resistances of said signal paths are in phase opposition to each other, a motor having two pairs of control windings and a flux source, interaction of the magnetic fields of said source and said windings providing a mechanical output from said motor, each of said control windings having two terminals, a first terminal of each winding being connected to a first terminal of the other winding in the same pair thereof, means connecting said first terminals in one pair of windings to the output signal path of said first control element, means connecting said first terminals in the other pair of windings to the output signal path of said second control element, and a reference signal source connected in series circuits including each of said windings and the output signal path connected thereto, said reference source including a source of electrical current and gating means adapted to apply electrical pulses from said current source to said signal paths, with one pulse occurring for each half cycle of said input signal and with alternate pulses being passed through one winding in each pair thereof and the remaining pulses through the other winding in each pair.

14. The combination defined in claim 13 in which said motor is adapted to respond to the sum of the differences of the currents through the control windings in each pair thereof.

15. The combination defined in claim 13 in which said windings have a common flux path and the senses of said windings is such that currents through the windings in a given pair generate flux in opposite directions along said path, and each winding in a pair thereof generates a flux in the same direction along said path as the winding in the other pair which conducts different pulses from said reference source.

16. The combination defined in claim 1 including a motor, said windings being control windings of said motor, said summing means being a magnetic flux path through said windings, said motor also including a flux source adapted to generate a magnetic field interacting with the fields generated by said windings along said flux path, thereby to provide a mechanical output.

17. In an output circuit adapted to provide a mechanical output in response to a modulated alternating-current electrical input signal, the combination of first and second control elements, each of said elements having a pair of input terminals and an output signal path, the impedances of said signal paths being functions of the instantaneous magnitudes of the signals applied to said pairs of input terminals, input means for applying said input signal to said pairs of input terminals in such manner that the variations of the impedances of said signal paths are in phase opposition to each other, a first set of windings comprising a first pair including first and second windings and a second pair including third and fourth windings, a second set of windings comprising a third pair including fifth and sixth windings, each of said windings having first and second terminals, the first terminal of each winding being connected to the first terminal of the other winding in the same pair, means connecting said first terminals of said first and second windings to one end of said signal path of said first control element, means connecting said first terminals of said third and fourth windings to one end of said signal path of said second control element, means connecting said first terminals of said fifth and sixth windings to the other ends of said signal paths, first and second diodes connected between said second terminals of said first and fourth windings and said second terminal of said fifth winding, third and fourth diodes connected between said second terminals of said second and third windings and said second terminals of said sixth winding, means for magnetically exciting one set of windings at the frequency of said input signal, the exciting flux being such as to provide opposite polarities of the voltages between said second and first terminals of the windings in the same pair in said excited set, a motor, the windings in the other set being control windings of said motor, said motor also having a magnetic flux source whose flux interacts with the flux of said control windings to provide mechanical output from said motor, the flux from said flux source having a uni-directional component with respect to the flux of said control windings, the senses of said control windings being such that current through each control from its second terminal toward its first terminal will cause motor output in a direction opposite to that caused by similar current in the other winding in the same pair, whereby when said input signal has the same phase as the flux in said excited set of windings current will flow through said first winding on alternate half cycles and through a winding in said second pair during every other half cycle, the current through control windings of said motor on both half cycles providing motor output in a first direction, and when said signal is in phase opposition to said excitation flux said second winding conducts on alternate half cycles and the other of said windings in said second pair conducts on every other half cycle, the current through control windings then providing motor output in a direction opposite to said first direction.

18. The combination defined in claim 17 in which said control windings are the windings of said first set, said control windings having a common flux path, the control windings in each pair thereof developing flux in opposite directions along said path for currents therethrough permitted by the diode connected thereto, each control winding developing flux in the opposite direction from the control winding whose series connected diode is adapted to pass current at the same time.

References Cited in the file of this patent

UNITED STATES PATENTS

| | | |
|---|---|---|
| 2,431,578 | Moyer et al. | Nov. 25, 1947 |

FOREIGN PATENTS

| | | |
|---|---|---|
| 909,012 | Germany | Apr. 12, 1954 |

UNITED STATES PATENT OFFICE

CERTIFICATE OF CORRECTION

Patent No. 2,973,468 February 28, 1961

Raymond E. Claflin, Jr., et al.

It is hereby certified that error appears in the above numbered patent requiring correction and that the said Letters Patent should read as corrected below.

Column 3, line 25, for "more" read -- motor --; line 44, after "field" strike out the comma; column 6, line 52, for "accuring" read -- accruing --; column 7, line 55, for "accure" read -- accrue --; column 11, line 42, for "terminals" read -- terminal --.

Signed and sealed this 26th day of September 1961.

(SEAL)
Attest:

ERNEST W. SWIDER
Attesting Officer

DAVID L. LADD
Commissioner of Patents

USCOMM-DC